United States Patent
Mealy et al.

(10) Patent No.: US 9,294,649 B2
(45) Date of Patent: Mar. 22, 2016

(54) POSITION CORRECTION IN HANDHELD IMAGE TRANSLATION DEVICE

(75) Inventors: James Mealy, Corvallis, OR (US); Asher Simmons, Corvallis, OR (US)

(73) Assignee: Marvell World Trade Ltd., St. Michael (BB)

( * ) Notice: Subject to any disclaimer, the term of this patent is extended or adjusted under 35 U.S.C. 154(b) by 2383 days.

(21) Appl. No.: 12/041,515

(22) Filed: Mar. 3, 2008

(65) Prior Publication Data

US 2008/0212120 A1 Sep. 4, 2008

Related U.S. Application Data

(60) Provisional application No. 60/892,722, filed on Mar. 2, 2007.

(51) Int. Cl.
| | |
|---|---|
| *G06K 15/00* | (2006.01) |
| *H04N 1/032* | (2006.01) |
| *H04N 1/04* | (2006.01) |
| *H04N 1/047* | (2006.01) |
| *H04N 1/107* | (2006.01) |
| *B41J 3/36* | (2006.01) |

(52) U.S. Cl.
CPC ............ *H04N 1/032* (2013.01); *H04N 1/047* (2013.01); *H04N 1/0461* (2013.01); *H04N 1/107* (2013.01); *H04N 1/1077* (2013.01); *B41J 3/36* (2013.01); *H04N 2201/0414* (2013.01); *H04N 2201/0471* (2013.01); *H04N 2201/04737* (2013.01); *H04N 2201/04789* (2013.01); *H04N 2201/04791* (2013.01); *H04N 2201/04794* (2013.01)

(58) Field of Classification Search
None
See application file for complete search history.

(56) References Cited

U.S. PATENT DOCUMENTS

| | | | |
|---|---|---|---|
| 5,278,582 A | 1/1994 | Hongo | |
| 5,387,976 A * | 2/1995 | Lesniak | 356/627 |
| 5,461,680 A | 10/1995 | Davis | |
| 5,578,813 A | 11/1996 | Allen et al. | |
| 5,927,872 A | 7/1999 | Yamada | |
| 5,930,466 A | 7/1999 | Rademacher | |
| 5,988,900 A | 11/1999 | Bobry | |
| 6,348,978 B1 | 2/2002 | Blumer et al. | |
| 6,357,939 B1 | 3/2002 | Baron | |
| 6,384,921 B1 | 5/2002 | Saijo et al. | |

(Continued)

FOREIGN PATENT DOCUMENTS

| | | |
|---|---|---|
| EP | 1209574 A2 | 5/2002 |
| JP | 11058844 A | 3/1999 |

(Continued)

OTHER PUBLICATIONS

U.S. Appl. No. 12/188,056, filed Aug. 7, 2008, Mealy et al.

(Continued)

*Primary Examiner* — Miya J Cato

(57) ABSTRACT

Systems, apparatuses, and methods for correcting position in a handheld image translation device are described herein. The handheld image translation device may include a position module to determine a first position of the device and a print module to deposit a printing substance on a medium adjacent to the device based at least in part on the position. The device may also include an image capture module to capture surface images of the section of the medium with printing substance deposited thereon. These surface images may be used by the position module to determine subsequent positions of the device. Other embodiments may be described and claimed.

11 Claims, 9 Drawing Sheets

(56) References Cited

U.S. PATENT DOCUMENTS

| | | |
|---|---|---|
| 7,038,712 B1 | 5/2006 | Livingston et al. |
| 7,200,560 B2 | 4/2007 | Philbert |
| 7,297,912 B1 | 11/2007 | Todoroff et al. |
| 7,410,100 B2 | 8/2008 | Muramatsu |
| 7,607,749 B2 | 10/2009 | Tabata et al. |
| 7,929,019 B2 | 4/2011 | Ohmura et al. |
| 7,949,370 B1 | 5/2011 | Bledsoe et al. |
| 7,988,251 B2 | 8/2011 | Dimitrijevic et al. |
| 2002/0154186 A1 | 10/2002 | Matsumoto |
| 2002/0158955 A1 | 10/2002 | Hess et al. |
| 2003/0150917 A1 | 8/2003 | Tsikos et al. |
| 2004/0021912 A1 | 2/2004 | Tecu et al. |
| 2004/0109034 A1 | 6/2004 | Brouhon |
| 2004/0208346 A1 | 10/2004 | Baharav et al. |
| 2005/0001867 A1* | 1/2005 | Akase ............... 347/16 |
| 2006/0061647 A1 | 3/2006 | Breton |
| 2006/0279784 A1 | 12/2006 | Carlson et al. |
| 2007/0150194 A1* | 6/2007 | Chirikov ............ 701/220 |
| 2008/0007762 A1* | 1/2008 | Robertson et al. ...... 358/1.15 |
| 2008/0144053 A1* | 6/2008 | Gudan et al. .......... 358/1.8 |
| 2008/0204770 A1 | 8/2008 | Bledsoe et al. |
| 2008/0212120 A1 | 9/2008 | Mealy et al. |
| 2009/0034018 A1 | 2/2009 | Lapstun et al. |
| 2009/0279148 A1 | 11/2009 | Lapstun et al. |
| 2010/0039669 A1 | 2/2010 | Chang et al. |
| 2010/0231633 A1 | 9/2010 | Lapstun et al. |

FOREIGN PATENT DOCUMENTS

| | | |
|---|---|---|
| JP | 2001301235 A | 10/2001 |
| JP | 2002307756 | 10/2002 |
| JP | 2006341604 | 12/2006 |

OTHER PUBLICATIONS

U.S. Appl. No. 11/955,209, filed Dec. 12, 2007, Bledsoe et al.
U.S. Appl. No. 11/955,228, filed Dec. 12, 2007, Bledsoe et al.
U.S. Appl. No. 11/955,240, filed Dec. 12, 2007, Bledsoe et al.
U.S. Appl. No. 11/955,258, filed Dec. 12, 2007, Simmons et al.
U.S. Appl. No. 11/959,027, filed Dec. 18, 2007, Simmons et al.
U.S. Appl. No. 11/968,528, filed Jan. 2, 2008, Simmons et al.
U.S. Appl. No. 11/972,462, filed Jan. 10, 2008, Simmons et al.
U.S. Appl. No. 12/013,313, filed Jan. 11, 2008, Bledsoe et al.
U.S. Appl. No. 12/016,833, filed Jan. 18, 2008, Simmons et al.
U.S. Appl. No. 12/036,996, filed Feb. 25, 2008, Bledsoe et al.
U.S. Appl. No. 12/037,029, filed Feb. 25, 2008, Bledsoe et al.
U.S. Appl. No. 12/037,043, filed Feb. 25, 2008, Bledsoe et al.
U.S. Appl. No. 12/038,660, filed Feb. 27, 2008, McKinley et al.
U.S. Appl. No. 12/041,496, filed Mar. 8, 2008, Mealy et al.
U.S. Appl. No. 12/041,535, filed Mar. 3, 2008, Mealy et al.
U.S. Appl. No. 12/062,472, filed Apr. 3, 2008, McKinley et al.
Fairchild, "IEEE 1284 Interface Design Solutions", Jul. 1999, Fairchild Semiconductor, AN-5010, 10 pages.
Texas Instruments, "Program and Data Memory Controller", Sep. 2004, SPRU577A, 115 pages.

\* cited by examiner

POSITION CORRECTION IN HANDHELD IMAGE TRANSLATION DEVICE

CROSS-REFERENCES TO RELATED APPLICATIONS

This present application is a non-provisional application of provisional application 60/892,722, filed on Mar. 2, 2007, and claims priority to said provisional application. The specification of said provisional application is hereby incorporated in its entirety, except for those sections, if any, that are inconsistent with this specification.

TECHNICAL FIELD

Embodiments of the present invention relate to the field of image translation and, in particular, to position correction in a handheld image translation device.

BACKGROUND

Traditional printing devices rely on a mechanically operated carriage to transport a print head in a linear direction as other mechanics advance a print medium in an orthogonal direction. As the print head moves over the print medium an image may be laid down. Portable printers have been developed through technologies that reduce the size of the operating mechanics. However, the principles of providing relative movement between the print head and print medium remain the same as traditional printing devices. Accordingly, these mechanics limit the reduction of size of the printer as well as the material that may be used as the print medium.

Handheld printing devices have been developed that ostensibly allow an operator to manipulate a handheld device over a print medium in order to print an image onto the medium. However, these devices are challenged by the unpredictable and nonlinear movement of the device by the operator. The variations of operator movement make it difficult to determine the precise location of the print head. This type of positioning error may have deleterious effects of the quality of the printed image. This is especially the case for relatively large print jobs, as the positioning error may accumulate in a compounded manner over the entire print operation.

SUMMARY

At least some embodiments of the present invention provide a handheld image translation device that may accurately determine position of the device over an entire image translation operation. More specifically, there is provided, in accordance with various embodiments of the present invention, a control block of a handheld image translation device that may include a position module configured to control one or more navigation sensors to determine a first position of the apparatus; a print module configured to cause a printing substance to be deposited on a medium adjacent to the apparatus based at least in part on the first position; and an image capture module configured to control an optical imaging sensor to capture a surface image of a section of the medium having the deposited printing substance, the position module being further configured to determine a second position of the apparatus based at least in part on the surface image.

In some embodiments, the position module is further configured to compare the surface image with a portion of a print image stored in memory of the apparatus and to determine the second position of the apparatus based at least further in part on said comparison.

In some embodiments, the control block may further include a communication interface configured to receive an image from an image source; and an image processing module configured to process the received image to generate the print image.

In some embodiments, the position module is further configured to periodically determine other positions of the apparatus based at least in part on other captured surface images.

In some embodiments, the position module is configured to determine the position of the apparatus relative to a reference location.

In accordance with further embodiments of the present invention, an image translation device may be disclosed. The image translation device may include an optical imaging sensor; one or more navigational sensors; a print head; and a control block configured to control the one or more navigational sensors to determine a first position of the apparatus; to control the print head to deposit a printing substance on a medium adjacent to the apparatus based at least in part on the determined first position; to control the optical imaging sensor to capture a surface image of a section of the medium having the deposited printing substance; and to determine a second position of the apparatus based at least in part on the surface image.

In some embodiments, the optical imaging sensor comprises a plurality of pixels in a first direction and another plurality of pixels in a second direction.

In some embodiments, the print head has a linear dimension and comprises one or more nozzle rows. The optical imaging sensor may include a linear array of optical elements having a linear dimension that is similar to the linear dimension of the print head. A first nozzle row of the one or more nozzle rows may be arranged on a first side of the linear array of optical elements and a second nozzle row of the one or more nozzle rows may be arranged on a second side of the linear array of optical elements.

In some embodiments, the image translation device may also include a plurality of balls disposed within respective capture cages configured to space the apparatus a distance from an adjacent medium.

In some embodiments, the print head includes a plurality of nozzles arranged around a plurality of optical elements of the optical imaging sensor. The plurality of nozzles may be arranged in rings around the plurality of optical elements.

A method for image translation is also described in accordance with various embodiments. The method may include determining a first position of an image translation device; depositing a printing substance on a medium adjacent to the image translation device based at least in part on the determined first position; capturing a surface image of a section of the medium having the deposited printing substance; and determining a second position of the image translation device based at least in part on a location of the deposited printing substance within the surface image.

In some embodiments, the method may further include accessing a print image from memory of the image translation device; comparing the surface image with a portion of the print image; and determining the second position based at least in part on said comparing.

In some embodiments, the method may further include comparing a plurality of surface images with a plurality of portions of the print image; and determining the second position based at least in part on said comparing of the plurality of surface images to the plurality of portions of the print image.

Another control block for an image translation device may be disclosed in accordance with various embodiments of the present invention. The control block may include means for determining a first position of an apparatus; means for depositing a printing substance on a medium adjacent to the apparatus based at least in part on the determined first position; means for capturing a surface image of a section of the medium having the deposited printing substance; and means for determining a second position of the apparatus based at least in part on a location of the deposited printing substance within the surface image.

In some embodiments, the control block may further include means for accessing a print image from memory of the apparatus; means for comparing the surface image with a portion of the print image; and means for determining the second position based at least in part on said comparing.

In some embodiments, the control block may further include means for comparing a plurality of surface images with a plurality of portions of the print image; and means for determining the second position based at least in part on said comparing of the plurality of surface images to the plurality of portions of the print image.

In still further embodiments, a machine-accessible medium may be described. The machine-accessible medium may have associated instructions, which, when executed results in an apparatus determining a first position of the apparatus; depositing a printing substance on a medium adjacent to the apparatus based at least in part on the determined first position; capturing a surface image of a section of the medium having the deposited printing substance; and determining a second position of the apparatus based at least in part on a location of the deposited printing substance within the surface image.

In some embodiments, the associated instructions, when executed further results in the apparatus accessing a print image from memory of the apparatus; comparing the surface image with a portion of the print image; and determining the second position based at least in part on said comparing.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Figure 1:
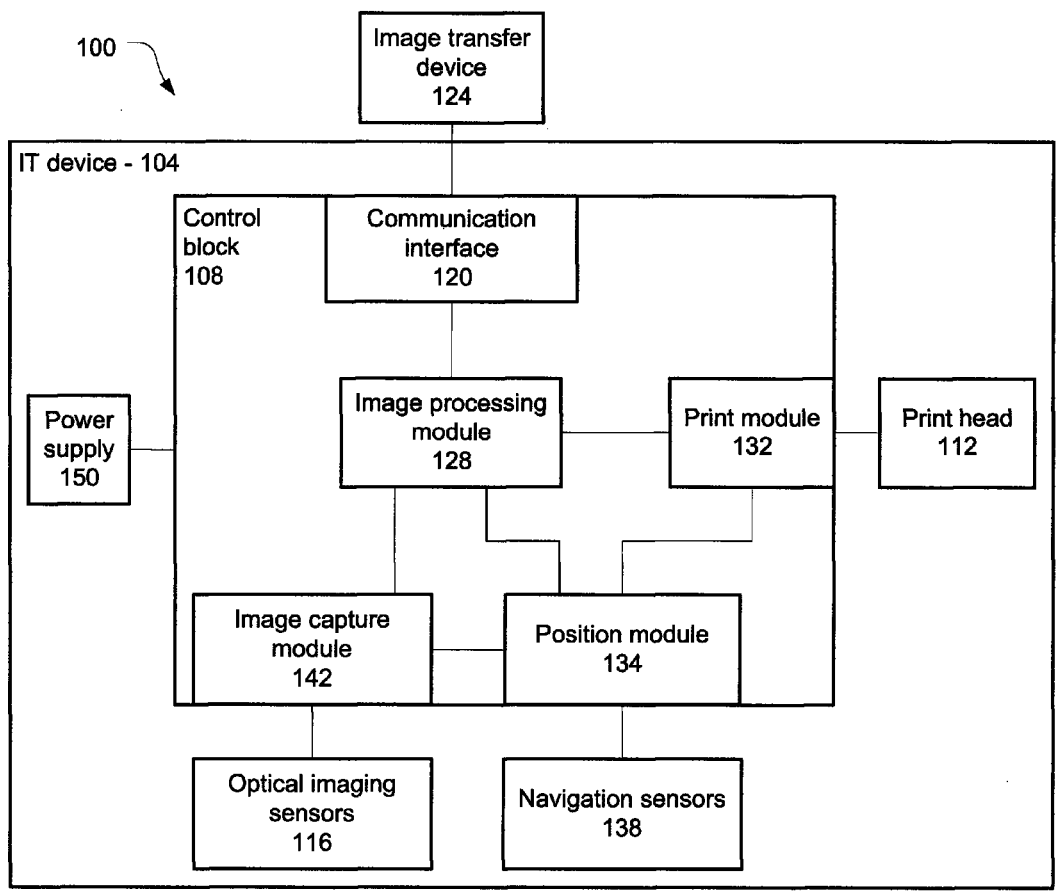
FIG. 1 is a schematic of a system including a handheld image translation device in accordance with various embodiments of the present invention.

FIG. 1 is a schematic of a system 100 including a handheld image translation (IT) device 104, hereinafter IT device 104, in accordance with various embodiments of the present invention. The IT device 104 may include a control block 108 with components designed to facilitate precise and accurate positioning of a print head 112 and/or one or more optical imaging sensors 116 throughout an IT operation. This positioning may allow for reliable image translation in a truly mobile and versatile platform as will be explained herein.

Image translation, as used herein, may refer to a translation of an image that exists in a particular context (e.g., medium) into an image in another context. For example, an IT operation may be a scan operation. In this situation, a target image, e.g., an image that exists on a tangible medium, is scanned by the IT device 104 and an acquired image that corresponds to the target image is created and stored in memory of the IT device 104. For another example, an IT operation may be a print operation. In this situation, an acquired image, e.g., an image as it exists in memory of the IT device 104, may be printed onto a print medium.

The control block 108 may include a communication interface 120 configured to communicatively couple the control block 108 to an image transfer device 124. The image transfer device 124 may be any type of device capable of transmitting data related to an image to be translated. The image transfer device 124 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image transfer device 124 is a removable storage device, e.g., a universal serial bus (USB) storage device, the communication interface may include a port, e.g., USB port, designed to receive the storage device.

The communication interface 120 may include a wireless transceiver to allow the communicative coupling with the image source 124 to take place over a wireless link. The image data may be wirelessly transmitted over the link through the modulation of electromagnetic waves with frequencies in the radio, infrared or microwave spectrums.

A wireless link may contribute to the mobility and versatility of the IT device 104. However, some embodiments may additionally/alternatively include a wired link communicatively coupling the image transfer device 124 to the communication interface 120.

In some embodiments, the communication interface 120 may communicate with the image transfer device 124 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

In an embodiment where an IT operation includes a print operation, the IT device 124 may transfer image data related to an image to be printed to the IT device 104 through the communication interface 120. The communication interface 120 may then transmit the received image data to an on-board image processing module 128. The image processing module 128 may process the received image data in a manner to facilitate an upcoming printing process. The processed image generated by the image processing module 128 may be referred to as the print image. Image processing techniques may include dithering, decompression, half-toning, color plane separation, and/or image storage. In various embodiments some or all of these image processing operations may be performed by the image transfer device 124 or another device. The print image may then be transmitted to a print module 132 where it is cached in anticipation of the printing of the image.

The print module 132 may also receive positioning information, indicative of a position of the print head 112 relative to a reference location, from a position module 134. The position module 134 may be communicatively coupled to one or more navigation sensors 138.

The navigation sensors 138 may include a light source, e.g., LED, a laser, etc., and an optoelectronic sensor designed to take a series of images of a medium, e.g., a print medium, adjacent to the IT device 104 as the IT device 104 is moved over the medium. The position module 134 may process the navigation images provided by the navigation sensors 138 to detect structural variations of the medium. The movement of the structural variations in successive images may indicate motion of the IT device 104 relative to the medium. Tracking this relative movement may facilitate determination of the precise positioning of the navigation sensors 138. The navigation sensors 138 may be maintained in a structurally rigid relationship with the print head 112, thereby allowing for the calculation of the precise location of the print head 112. In other embodiments, non-imaging navigation sensors may be used.

The print medium, as used in embodiments herein, may be any type of medium on which a printing substance, e.g., ink, powder, etc., may be deposited. It is not limited to printed paper or other thin, flexible print media commonly associated with traditional printing devices.

The navigation sensors 138 may have operating characteristics sufficient to track movement of the IT device 104 with the desired degree of precision. In one example, the navigation sensors 138 may process approximately 2000 frames per second, with each frame including a rectangular array of 30×30 pixels. Each pixel may detect a six-bit interference pattern value, e.g., capable of sensing 64 different levels of patterning. Utilizing positioning correction, described herein in accordance with various embodiments, may permit the navigation sensors 138 to have lower resolutions than would otherwise be required to support desired positioning accuracy.

Once the print module 132 receives the positioning information it may coordinate the location of the print head 112 to a portion of the print image with a corresponding location. The print module 132 may then control the print head 112 in a manner to deposit a printing substance on the print medium to represent the corresponding portion of the processed image.

The print head 112 may be an inkjet print head having a plurality of nozzles designed to emit liquid ink droplets. The ink, which may be contained in reservoirs/cartridges, may be black and/or any of a number of various colors. A common, full-color inkjet print head may have nozzles for cyan, magenta, yellow, and black ink. Other embodiments may utilize other printing techniques, e.g., toner-based printers such as laser or light-emitting diode (LED) printers, solid ink printers, dye-sublimation printers, inkless printers, etc.

The control block 108 may also include an image capture module 142. The image capture module 142 may be communicatively coupled to the optical imaging sensors 116. The optical imaging sensors 116 may include a number of individual sensor elements. The optical imaging sensors 116 may be designed to capture a plurality of surface images of the print medium, which may be individually referred to as component surface images. The image capture module 142 may generate a composite image by stitching together the component surface images. The image capture module 142 may receive positioning information from the position module 134 to facilitate the arrangement of the component surface images into the composite image.

Relative to a navigation sensor, an optical imaging sensor may have a higher resolution, smaller pixel size, and/or higher light requirements. While a navigation sensor is configured to capture details about the structure of the underlying medium, an optical imaging sensor may be configured to capture an image of the surface of the medium itself.

In an embodiment in which the IT device 104 is capable of scanning full color images, the optical imaging sensors 116 may have sensor elements designed to scan different colors.

A composite image acquired by the IT device 104 may be subsequently transmitted to the image transfer device 124 by, e.g., e-mail, fax, file transfer protocols, etc. The composite image may be additionally/alternatively stored locally by the IT device 104 for subsequent review, transmittal, printing, etc.

In addition (or as an alternative) to composite image acquisition, the image capture module 142 may be utilized for calibrating the position module 134. In various embodiments, the component surface images (whether individually, some group, or collectively as the composite image) may be taken of a section of the print medium that has at least some printing substance deposited thereon. The position module 134 may then compare these component surface images with corresponding portions of the print image rendered by the image processing module 128 to correct for accumulated positioning errors and/or to reorient the position module 134 in the event the position module 134 loses track of its reference point, which may happen, e.g., if the IT device 104 is removed from the print medium during an image translation operation.

Figure 4:
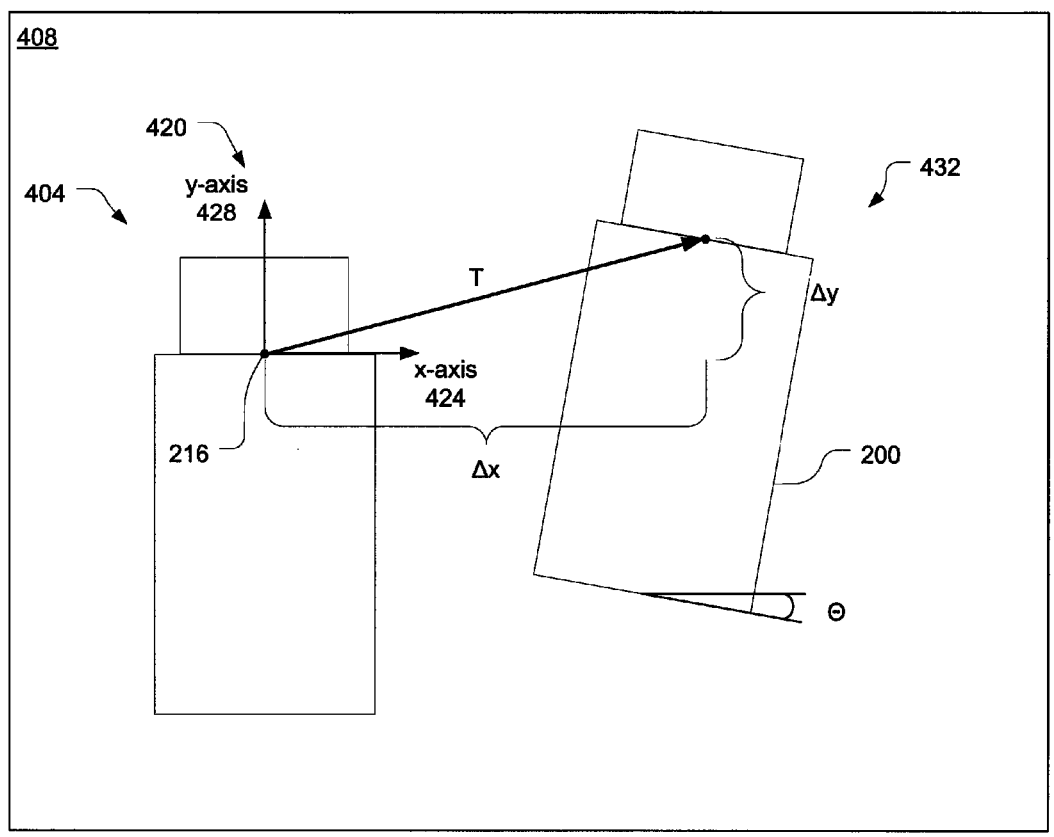
FIG. 4 is an illustration depicting movement of a handheld image translation device in accordance with various embodiments of the present invention.
Figure 5:
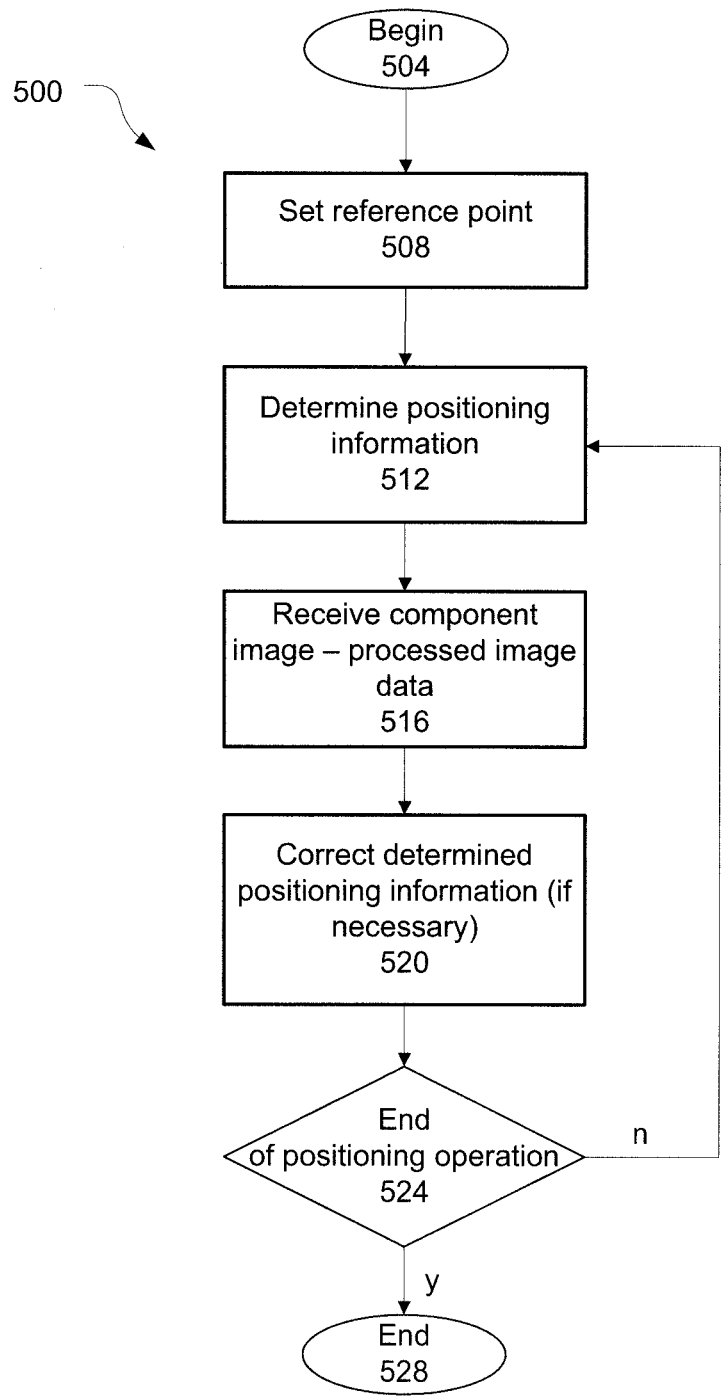
FIG. 5 is a flow diagram depicting a positioning operation of a handheld image translation device in accordance with various embodiments of the present invention.
Figure 6:
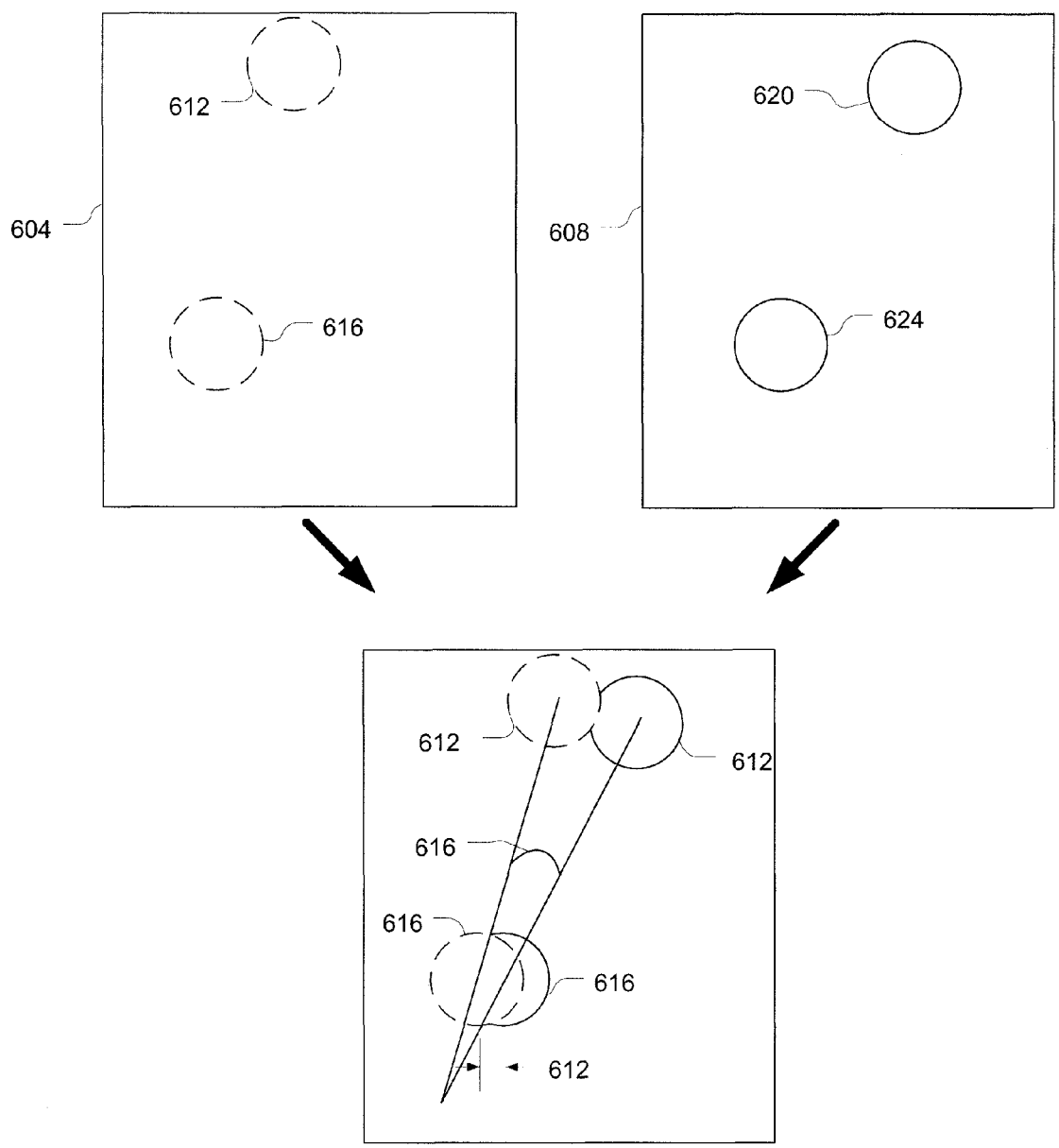
FIG. 6 is an illustration depicting a comparison of a print image to a captured surface image in accordance with various embodiments of the present invention.

Using the component images to correct positioning of the IT device 104 may be explained in further detail in the discussion referencing FIGS. 4-6 to follow.

The IT device 104 may also include a power supply 150 coupled to the control block 108. The power supply 150 may be a mobile power supply, e.g., a battery, a rechargeable battery, a solar power source, etc. In other embodiments the power supply 150 may additionally/alternatively regulate power provided by another component (e.g., the image transfer device 124, a power cord coupled to an alternating current (AC) outlet, etc.).

Figure 2:
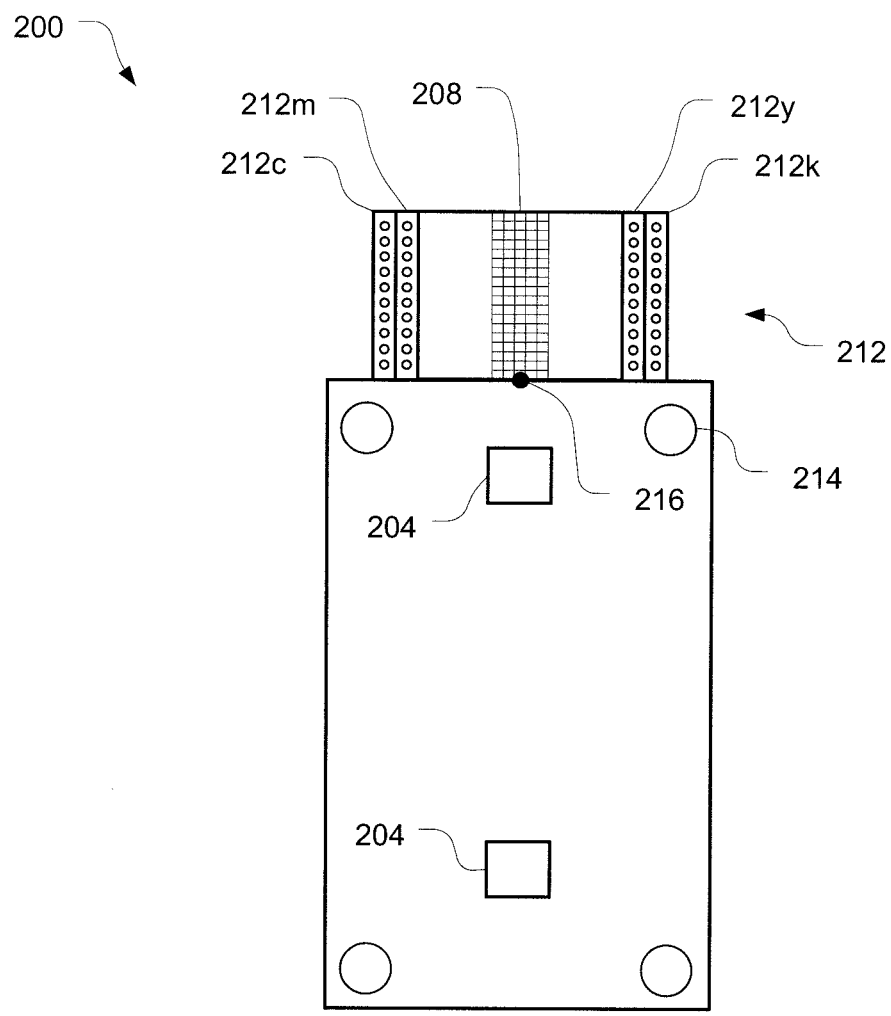
FIG. 2 is a bottom plan view of a handheld image translation device in accordance with various embodiments of the present invention.

FIG. 2 is a bottom plan view of an IT device 200 in accordance with various embodiments of the present invention. The IT device 200, which may be substantially interchangeable with IT device 104, may have a pair of navigation sensors 204, an optical imaging sensor 208, and a print head 212.

The pair of navigation sensors 204 may be used by a position module to determine positioning information related to the optical imaging sensor 208 and/or the print head 212. As stated above, the proximal relationship of the optical imaging sensor 208 and/or print head 212 to the navigation sensors 204 may be fixed to facilitate the positioning of the optical imaging sensor 208 and/or print head 212 through information obtained by the navigation sensors 204.

The print head 212 may be an inkjet print head having a number of nozzle rows for different colored inks. In particular, and as shown in FIG. 2, the print head 212 may have a nozzle row 212c for cyan-colored ink, a nozzle row 212m for magenta-colored ink, a nozzle row 212y for yellow-colored ink, and nozzle row 212k for black-colored ink. The nozzle rows of the print head 212 may be arranged around the optical imaging sensor 208. This may allow for the optical imaging sensor 208 to capture information about the ink deposited on the print medium, which represents the processed image in various formative stages, for the predominant side-to-side motion of the IT device 200.

In various embodiments the placement of the nozzles of the print head 212 and the sensor elements of the optical imaging sensor 208 may be further configured to account for the unpredictable nature of movement of the hand-propelled IT device 200. For example, while the nozzles and sensor elements are arranged in linear arrays in the IT device 200 other embodiments may arrange the nozzles and/or sensor elements in other patterns. In some embodiments the nozzles may be arranged completely around the sensor elements so that whichever way the IT device 200 is moved the optical imaging sensor 208 will capture component images reflecting deposited ink. In some embodiments, the nozzles may be arranged in rings around the sensor elements (e.g., concentric circles, nested rectangular patterns, etc.).

While the nozzle rows 212c, 212m, 212y, and 212k shown in FIG. 2 are arranged in rows according to their color, other embodiments may intermix the different colored nozzles in a manner that may increase the chances that an adequate amount of appropriate colored ink is deposited on the print medium through the natural course of movement of the IT device 200 over the print medium.

In the embodiment depicted by FIG. 2, the linear dimension of the optical imaging sensor 208 may be similar to the linear dimension of the nozzle rows of the print head 212. The linear dimensions may refer to the dimensions along the major axis of the particular component, e.g., the vertical axis of the optical imaging sensor 208 as shown in FIG. 2. Having similar linear dimensions may provide that roughly the same amount of passes over a print medium are required for a complete scan and print operation. Furthermore, having similar dimensions may also facilitate the positioning calibration as a component surface image captured by the optical imaging sensor 208 may correspond to deposits from an entire nozzle row of the print head 212.

Similar to typical optical imaging sensors, the optical imaging sensor 208 of one embodiment may include a number of optical elements (or "pixels"), e.g., six-hundred, along its major axis. However, unlike typical optical imaging sensors, which are only one pixel wide, the optical imaging sensor 208 may also have a plurality of pixels, e.g., fifty, along its minor axis. The number of pixels along the major axis may be chosen to provide a linear dimension similar to the print head and/or sufficient width to a scan swath. The number of pixels along the minor axis may be chosen so that there is a reasonable chance of overlap between successive component images at an expected rate of motion of the IT device 200 over the medium. These overlapping portions may facilitate the alignment of the stitching process.

The IT device 200 may include spacers 214 configured to keep the components of the IT device 200 a desired distance from the medium. In some embodiments, the spacers may include balls disposed in capture cages. This may allow the IT device 200 to be moved over a loose medium without the medium being moved.

A datum 216 may be used as a reference point in the positioning of the optical imaging sensor 208 and/or print head 212.

Figure 3:
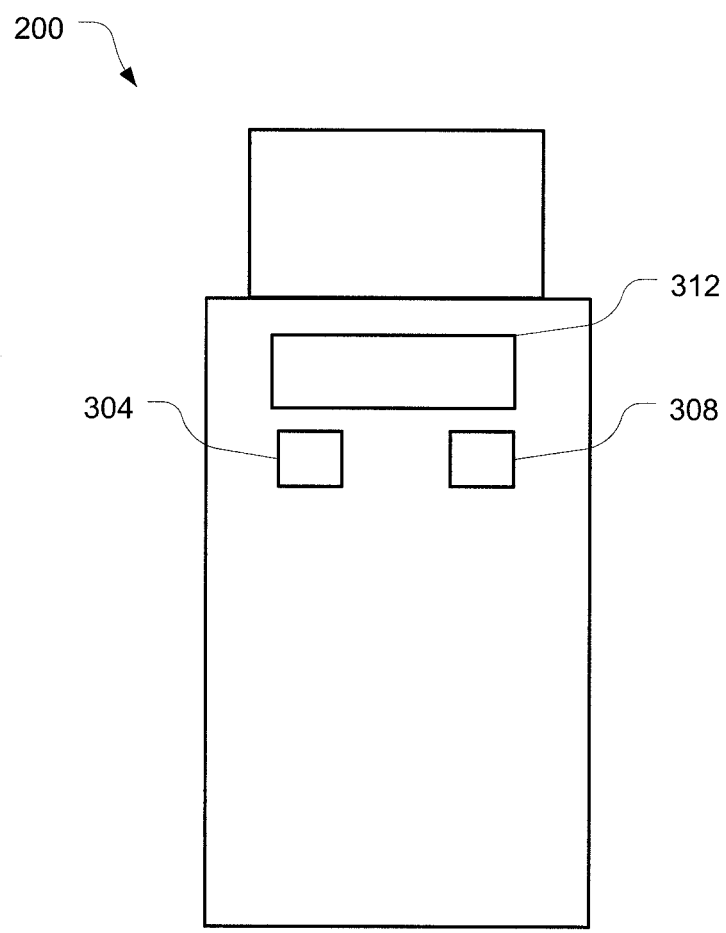
FIG. 3 is a top plan view of a handheld image translation device in accordance with various embodiments of the present invention.

FIG. 3 is a top plan view of the IT device 200 in accordance with various embodiments of the present invention. The IT device 200 may have a variety of user input/outputs to provide the functionality enabled through use of the IT device 200. Some examples of input/outputs that may be used to provide some of the basic functions of the IT device 200 include, but are not limited to, a print control input 304 to initiate/resume a print operation, a scan control input 308 to initiate/resume a scan operation, and a display 312.

The display 312, which may be a passive display, an interactive display, etc., may provide the user with a variety of information. The information may relate to the current operating status of the IT device 200 (e.g., printing, ready to print, scanning, ready to scan, receiving print image, transmitting print image, transmitting scan image, etc.), power of the battery, errors (e.g., scanning/positioning/printing error, etc.), instructions (e.g., "position device over a printed portion of the image for reorientation," etc.). If the display 312 is an interactive display it may provide a control interface in addition to, or as an alternative from, the control inputs 304 and 308.

FIG. 4 illustrates movement of the IT device 200 and FIG. 5 is a flow diagram 500 depicting a corresponding positioning operation in accordance with various embodiments of the present invention. A positioning operation may begin in block 504 with an initiation of an IT operation, e.g., by activation of the print control input 304 or the scan control input 308.

At block 508, a position module within the IT device 200 may set a reference location 404. The reference location 404 may be established by the IT device 200 being set on a medium 408 and zeroed out. That the IT device 200 is set on the print medium 408 may be ensured by the user being instructed to activate the control input once the IT device 200 is in place and/or by the proper placement of the IT device 200 being treated as a condition precedent to instituting the positioning operation. In some embodiments the proper placement of the IT device 200 may be automatically determined through the navigation sensors 204, the optical imaging sensor 208, and/or some other sensors (e.g., a proximity sensor).

In establishing the reference location, the user may be instructed to align the datum 216 or another reference of the IT device 200 at a certain location of the print medium 408 (e.g., bottom left corner of the print medium 312) and/or a certain location of the image to be printed (e.g., the bottom left corner of the image to be printed).

When the reference location 404 is established, a world-space (w-s) coordinate system 420 may be provided with an origin set at a location of the datum 216 (or some other point), an x-axis 424, and a y-axis 428.

Once the reference location 404 is set, the IT device 200 may be moved to a subsequent location 432. The position module may then determine positioning information, e.g., a translation T and/or a rotation $\Theta$, relative to the reference location 404, using the navigation sensors 204 at block 512. The positioning information may be determined by tracking incremental changes of the positions of the navigation sensors 204 and translating the incremental changes into $\Delta x$ and $\Delta y$ values in the w-s coordinate system 420.

The position module may also receive a captured surface image from the optical imaging sensor 208 and print image data from the image processing module at block 416. These images may be compared and, if necessary, positioning information may be corrected at block 520.

FIG. 6 illustrates a captured surface image 604 being compared to a portion of the print image 608 for position correction in accordance with an embodiment of the present invention. The captured surface image 604, which may include one or more component images, may include features 612 and 616. Each of the features 612 and 616 may be individual printing substance deposits or a plurality of deposits that combine to form a pattern. A portion of the print image 608 having features 620 and 624 that respectively correlate to features 612 and 616 may be located in memory of the IT device 200. The features 620 and 624 may represent the areas in which the print module intended to deposit printing substances.

The captured image 604 may be overlaid with the print image 608 and the locations of the various features may be compared. In particular, the position module comparison of the captured surface image 604 and the print image 608 may result in a determination that the $\Delta x$ of the positioning information needs to be adjusted by a value 612 in the positive x direction and the $\Theta$ of the positioning information needs to be adjusted by a value 616. This corrected positioning information may then serve as the basis for a subsequent positioning determination.

In order to conclude that surface image features 612 and 616 truly correlate to print image features 620 and 624, it may be desirable that the feature pattern is uniquely identifiable within the examination boundaries, e.g., boundaries of the captured surface image 604.

If correlateable features are not found within the examination boundaries (which may be the case if features cannot be uniquely identified or there are insufficient deposits of printing substance) the examination boundaries may be expanded, e.g., by stitching component surface images together, until such features are found. Alternatively, correction may be postponed until a subsequent captured surface image identifies correlateable features within the examination boundaries.

Position correction may not need to take place with every captured component surface image. Periodic correction may be sufficient to provide accurate tracking of the IT device 200 and may also work to avoid overburdening the computational resources of the position module.

Following correction at block 420, the position module may determine whether the positioning operation is complete in block 424. If it is determined that the positioning operation is not yet complete, the operation may loop back to block 412 and another positioning determination for another location of the IT device 200 may be done on the basis of the corrected positioning information. If it is determined that it is the end of the positioning operation, the operation may end in block 428. The end of the positioning operation may be tied to the end of the IT operation, which will be discussed with reference to FIGS. 7 and 8, respectively.

Error in positioning information may tend to be progressively accumulated as incremental position changes are recorded by the navigation sensors 204 and translated into the w-s coordinate system 420 throughout an IT operation. Utilizing the positioning correction of the disclosed embodiments may reduce and/or mitigate this accumulation of positioning error. However, it may be that some positioning error is still accumulated. Thus, it may be that the closer a printed image is to the reference location, the more reliable positioning information derived from the printed image may be. Accordingly, in some embodiments, the IT device 200 may utilize the reliability of these portions of the printed images to perform position corrections by periodically retracing the areas of the printed image closer to the reference location 408. This may occur naturally as a print swath is overlapped with a section of the previous print swath.

Figure 7:
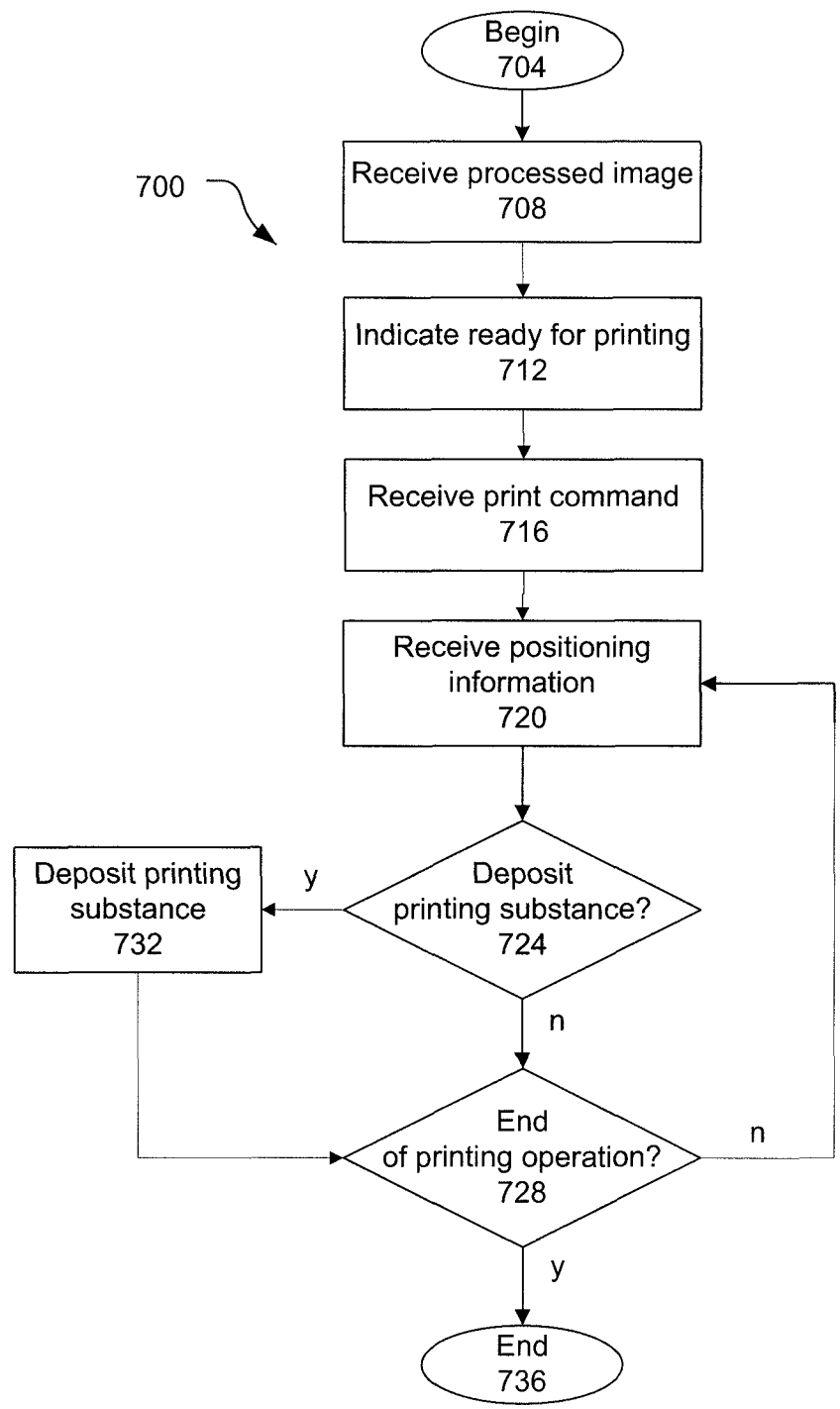
FIG. 7 is a flow diagram depicting a printing operation of a handheld image translation device in accordance with various embodiments of the present invention.

FIG. 7 is a flow diagram 700 depicting a printing operation of the IT device 200 in accordance with various embodiments of the present invention. The printing operation may begin at block 704. The print module may receive a processed image from the image processing module at block 708. Upon receipt of the processed image, the display may indicate that the IT device 200 is ready for printing at block 712.

The print module may receive a print command generated from a user activating the print control input 304 at block 716. The print module may then receive positioning information from the position module at block 720. The print module may then determine whether to deposit printing substance at the given position at block 724. The determination as to whether to deposit printing substance may be a function of the total drop volume for a given location and the amount of volume that has been previously deposited.

If it is determined that no additional printing substance is to be deposited in block 724, the operation may advance to block 728 to determine whether the end of the print operation has been reached. If it is determined that additional printing substance is to be deposited at block 724, the print module may cause an appropriate amount of printing substance to be deposited at block 732 by generating and transmitting control signals to the print head that cause the nozzles to drop the printing substance.

The determination of whether the end of the printing operation has been reached in block 728 may be a function of the printed volume versus the total print volume. In some embodiments the end of the printing operation may be reached even if the printed volume is less than the total print volume. For example, an embodiment may consider the end of the printing operation to occur when the printed volume is ninety-five percent of the total print volume. However, it may be that the distribution of the remaining volume is also considered in the end of print analysis. For example, if the five percent remaining volume is distributed over a relatively small area, the printing operation may not be considered to be completed.

In some embodiments, an end of print job may be established by a user manually cancelling the operation.

If, at block 728, it is determined that the printing operation has been completed, the printing operation may conclude at block 736.

If, at block 728, it is determined that the printing operation has not been completed, the printing operation may loop back to block 720.

Figure 8:
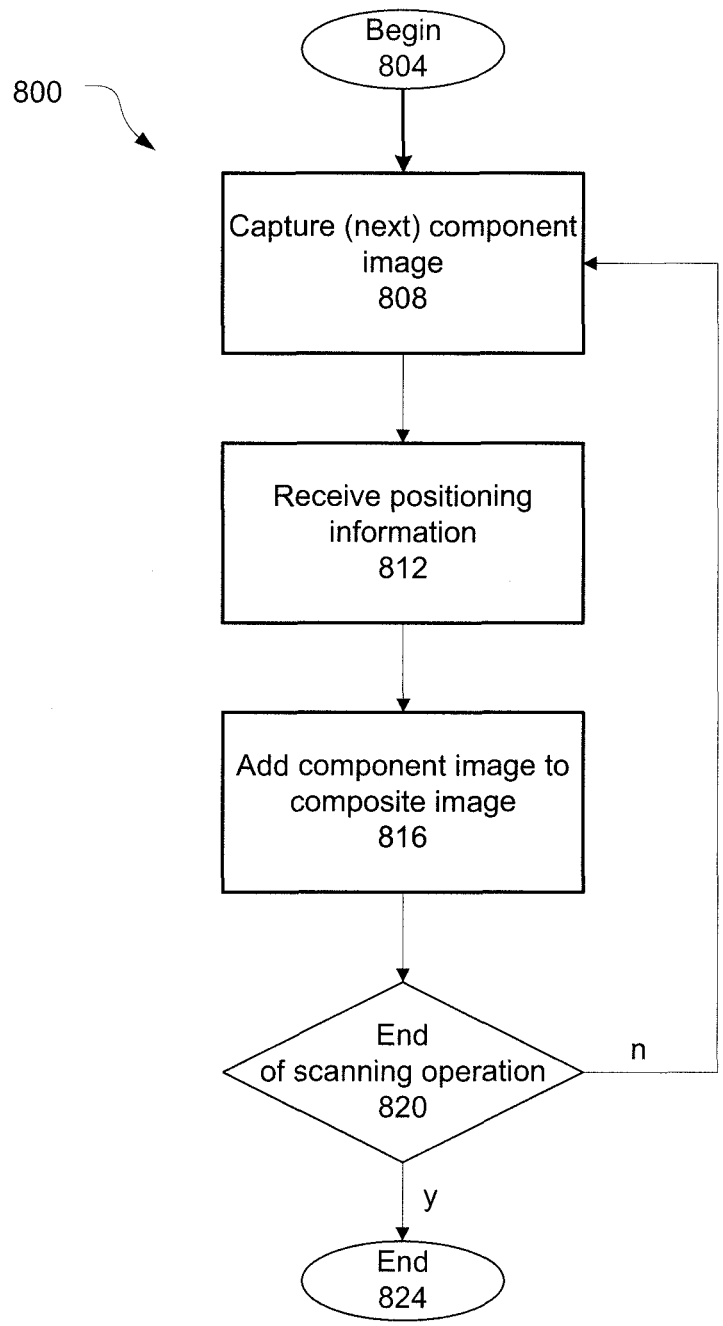
FIG. 8 is a flow diagram depicting a scanning operation of a handheld image translation device in accordance with various embodiments of the present invention.

FIG. 8 is a flow diagram 800 depicting a scanning operation of the IT device 200 in accordance with various embodiments of the present invention. The scanning operation may begin at block 804 with the receipt of a scan command generated from a user activating the scan control input 308.

The image capture module may control the optical imaging sensors 208 to capture one or more component images at block 808. In some embodiments, the scan operation will only commence when the IT device 200 is placed on a medium. This may be ensured by manners similar to those discussed above with respect to the printing operation, e.g., by instructing the user to initiate scanning operation only when the IT device 200 is in place and/or automatically determining that the IT device 200 is in place.

The image capture module may receive positioning information from the position module at block 812 and add the component images to the composite image at block 816. The image capture module may then determine if the scanning operation is complete at block 820.

The end of the scanning operation may be determined through a user manually cancelling the operation and/or through an automatic determination. In some embodiments, an automatic determination of the end of scan job may occur when all interior locations of a predefined image border have been scanned. The predefined image border may be determined by a user providing the dimensions of the image to be scanned or by tracing the border with the IT device 200 early in the scanning sequence.

If, at block 820, it is determined that the scanning operation has been completed, the scanning operation may conclude in block 824.

If, at block 820, it is determined that the scanning operation has not been completed, the printing operation may loop back to block 808.

Figure 9:
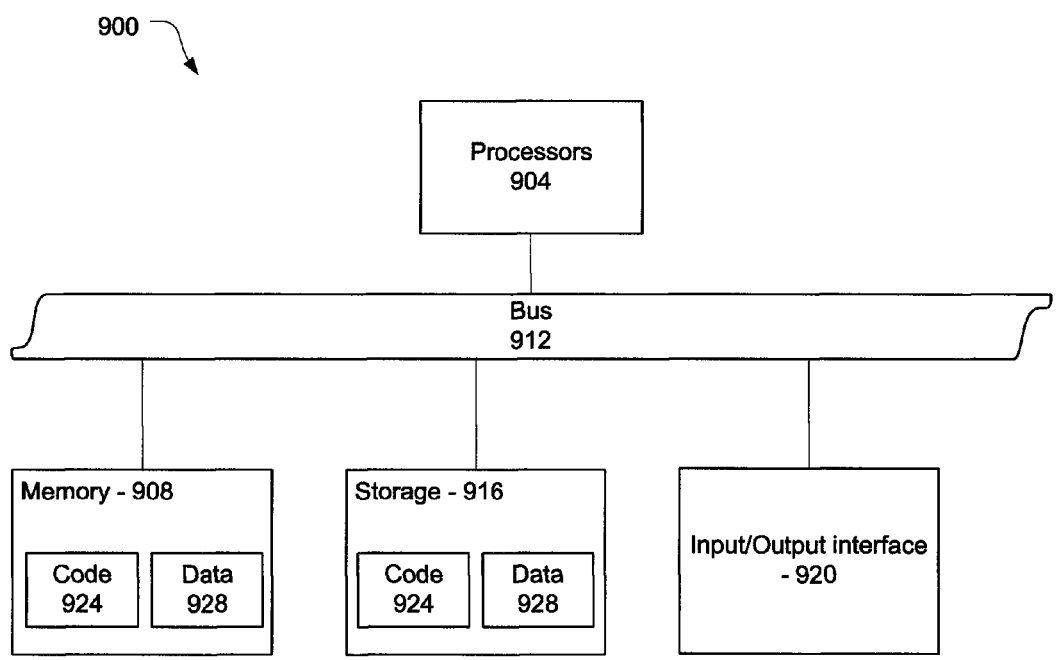
FIG. 9 illustrates a computing device capable of implementing a control block of a handheld image translation device in accordance with various embodiments of the present invention.

FIG. 9 illustrates a computing device 900 capable of implementing a control block, e.g., control block 108, in accordance with various embodiments. As illustrated, for the embodiments, computing device 900 includes one or more processors 904, memory 908, and bus 912, coupled to each other as shown. Additionally, computing device 900 includes storage 916, and one or more input/output interfaces 920 coupled to each other, and the earlier described elements as shown. The components of the computing device 900 may be designed to provide the image translation and/or positioning functions of a control block of a IT device as described herein.

Memory 908 and storage 916 may include, in particular, temporal and persistent copies of code 924 and data 928, respectively. The code 924 may include instructions that when accessed by the processors 904 result in the computing device 900 performing operations as described in conjunction with various modules of the control block in accordance with embodiments of this invention. The processing data 928 may include data to be acted upon by the instructions of the code 924. In particular, the accessing of the code 924 and data 928 by the processors 904 may facilitate the image translation and/or positioning operations as described herein.

The processors 904 may include one or more single-core processors, multiple-core processors, controllers, application-specific integrated circuits (ASICs), etc.

The memory 908 may include random access memory (RAM), dynamic RAM (DRAM), static RAM (SRAM), synchronous DRAM (SDRAM), dual-data rate RAM (DDRRAM), etc.

The storage 916 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 916 may be a storage resource physically part of the computing device 900 or it may be accessible by, but not necessarily a part of, the computing device 900. For example, the storage 916 may be accessed by the computing device 900 over a network.

The I/O interfaces 920 may include interfaces designed to communicate with peripheral hardware, e.g., print head 112, navigation sensors 138, optical imaging sensors 116, etc., and/or remote devices, e.g., image transfer device 124.

In various embodiments, computing device 900 may have more or less elements and/or different architectures.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. An apparatus comprising:
   a memory configured to store an image to be translated onto a medium;
   a position module configured to control one or more navigation sensors to determine a first position of the apparatus relative to the medium;
   a print module comprising a print head, the print module configured to cause a printing substance to be deposited on the medium based at least in part on the determined first position of the apparatus relative to the medium;
   an image capture module configured to control an optical imaging sensor to capture a surface image of a section of the medium having the deposited printing substance;
   wherein the position module is further configured to
      compare the captured surface image of the section of the medium with a portion of an image stored in the memory, and
      determine a second position of the apparatus relative to the medium based at least in part on the comparison,
   wherein the print head comprises one or more nozzle rows, and
   wherein the optical imaging sensor includes a linear array of optical elements having a linear dimension that is similar to a linear dimension of the print head.

2. The apparatus of claim 1, further comprising:
   a communication interface configured to receive the image from an image source; and
   an image processing module configured to process the image prior to the image being translated to the medium.

3. The apparatus of claim 1, wherein the position module is configured to periodically determine other positions of the apparatus based at least in part on other captured surface images.

4. The apparatus of claim 1, wherein the position module is configured to determine the position of the apparatus relative to a reference location.

5. An apparatus comprising:
   a memory configured to store an image to be translated onto a medium;
   an optical imaging sensor;
   one or more navigational sensors;

a print head;
a control block configured to
    control the one or more navigational sensors to determine a first position of the apparatus relative to the medium;
    control the print head to deposit a printing substance on the medium based at least in part on the determined first position of the apparatus relative to the medium;
    control the optical imaging sensor to capture a surface image of a section of the medium having the deposited printing substance;
    determine a second position of the apparatus relative to the medium based at least in part on comparing the captured surface image with the image stored in the memory,
wherein the print head comprises one or more nozzle rows, and
wherein the optical imaging sensor includes a linear array of optical elements having a linear dimension that is similar to a linear dimension of the print head.

6. The apparatus of claim 5, wherein the optical imaging sensor comprises a first plurality of pixels in a first direction and a second plurality of pixels in a second direction.

7. The apparatus claim 5, wherein a first nozzle row of the one or more nozzle rows is arranged on a first side of the linear array of optical elements and a second nozzle row of the one or more nozzle rows is arranged on a second side of the linear array of optical elements.

8. The apparatus of claim 5, further comprising:
a plurality of balls disposed within respective capture cages configured to space the apparatus a distance from an adjacent medium.

9. A method comprising:
determining a first position of an image translation device relative to a medium;
depositing, via a print head, a printing substance on the medium based at least in part on the determined first position of the image translation device relative to the medium;
capturing, by an optical imaging sensor, a surface image of a section of the medium having the deposited printing substance;
accessing an image from memory of the image translation device, wherein the image is to be translated onto the medium;
comparing the captured surface image with a portion of the image accessed from the memory; and
determining a second position of the image translation device relative to the medium based at least in part on comparing the captured surface image with the portion of the image accessed from the memory,
wherein the print head comprises one or more nozzle rows, and
wherein the optical imaging sensor includes a linear array of optical elements having a linear dimension that is similar to a linear dimension of the print head.

10. An apparatus comprising:
means for storing an image to be translated onto a medium;
means for determining a first position of the apparatus relative to the medium;
means for depositing a printing substance on the medium based at least in part on the determined first position of the apparatus relative to the medium, wherein the means for depositing comprises a print head;
means for capturing a surface image of a section of the medium having the deposited printing substance, wherein the means for capturing comprises an optical imaging sensor; and
means for determining a second position of the apparatus relative to the medium based at least in part on comparing the captured surface image with the stored image,
wherein the print head comprises one or more nozzle rows, and
wherein the optical imaging sensor includes a linear array of optical elements having a linear dimension that is similar to a linear dimension of the print head.

11. A non-transitory machine-accessible medium having associated instructions, which when executed results in an apparatus:
storing an image to be translated onto a medium;
determining a first position of the apparatus relative to the medium;
depositing, via a print head, a printing substance on the medium based at least in part on the determined first position of the apparatus relative to the medium;
capturing, using an optical imaging sensor, a surface image of a section of the medium having the deposited printing substance; and
determining a second position of the apparatus relative to the medium based at least in part on comparing the captured surface image with the stored image,
wherein the print head comprises one or more nozzle rows, and
wherein the optical imaging sensor includes a linear array of optical elements having a linear dimension that is similar to a linear dimension of the print head.

* * * * *

UNITED STATES PATENT AND TRADEMARK OFFICE
CERTIFICATE OF CORRECTION

PATENT NO. : 9,294,649 B2
APPLICATION NO. : 12/041515
DATED : March 22, 2016
INVENTOR(S) : James Mealy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2390 days.

Signed and Sealed this
Twenty-eighth Day of June, 2016

Michelle K. Lee
*Director of the United States Patent and Trademark Office*